United States Patent
Saisan

(10) Patent No.: US 8,370,114 B1
(45) Date of Patent: *Feb. 5, 2013

(54) METHOD AND APPARATUS FOR OPTIMAL PLACEMENT OF ACTUATORS FOR SHAPING DEFORMABLE MATERIALS INTO DESIRED TARGET SHAPES

(75) Inventor: Payam Saisan, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1229 days.

This patent is subject to a terminal disclaimer.

(21) Appl. No.: 11/986,684

(22) Filed: Nov. 21, 2007
(Under 37 CFR 1.47)

Related U.S. Application Data

(60) Provisional application No. 60/866,813, filed on Nov. 21, 2006.

(51) Int. Cl.
*G06F 17/50* (2006.01)
(52) U.S. Cl. .............. 703/1; 703/4; 73/105; 73/104
(58) Field of Classification Search ............ 703/2, 1, 703/4; 73/105, 104
See application file for complete search history.

(56) References Cited

U.S. PATENT DOCUMENTS

| | | | |
|---|---|---|---|
| 490,288 A | 1/1893 | Hubbard | |
| 4,936,467 A | 6/1990 | Bobeczko | |
| 5,040,808 A | 8/1991 | McIntyre | |
| 5,097,771 A | 3/1992 | James | |
| 5,584,404 A | 12/1996 | Tsai | |
| 5,706,737 A | 1/1998 | Whitehead et al. | |
| 5,871,105 A | 2/1999 | Whitehead et al. | |
| 5,988,409 A | 11/1999 | Gusdorf et al. | |
| 6,257,425 B1 | 7/2001 | Liu | |
| 6,290,075 B1 | 9/2001 | Chelmets et al. | |
| D456,658 S | 5/2002 | Harwanko | |
| D477,957 S | 8/2003 | Mikich et al. | |
| 6,702,128 B2 | 3/2004 | Winig et al. | |
| 7,150,364 B2 | 12/2006 | Jablow et al. | |
| 2006/0037923 A1 | 2/2006 | Newman | |

OTHER PUBLICATIONS

Tong et al. Piezoelectric actuator orientation optimization for static shape control of composite plates Composite Structures 55, Elsevier Science Ltd., pp. 169-184, 2002.*
Clerc et al. The Particle Swarm-Explosion, Stability, and convergence in a Multidimensional Complex Space, IEEE Transaction on Evolutionary Computation, vol. 6, No. 1, Feb. 2002, pp. 58-73.*
Gregory Washington, Hwan-Sik Yoon, Marc Angelino, Wilhelmus Theunissen Design, Modeling, and Optimization of Mechanically Reconfigurable Aperture Antennas IEEE Transactions of Antennas and Propagation, vol. 50, No. 5, May 2002, pp. 628-637.*
N.I. Akhiezer and I.M. Glazman, "Theory of linear operators in Hilbert Spaces," Frederick Ungar Publisher, 1966.
G.H. Golub and C.F. Van Loan, "Matrix Computations," The John Hopkins University Press, p. 601, 1996.
P. Saisan, A. Bissacco, A. Chiuso, and S. Soatto, "Modeling and synthesis of facial motion driven by speech," Proceedings of ECCV, Prague, 2004.

(Continued)

*Primary Examiner* — Kamini S Shah
*Assistant Examiner* — Cuong Luu
(74) *Attorney, Agent, or Firm* — Tope-McKay & Associates

(57) ABSTRACT

The invention is a novel method and apparatus for optimal placement of actuators responsible for shaping of elastically deformable structures into desired target shapes using sparse number of actuators such that the discrepancy between deformed surfaces and target shapes is minimized. The invention utilizes a computational algorithm for optimal placement of actuators using particle swarm optimization, a biologically inspired evolutionary optimization paradigm that searches for the minima (or maxima) of objective functions with possibly large number of parameters.

6 Claims, 6 Drawing Sheets

OTHER PUBLICATIONS

G. Chanan, D.G. Mac Martin, J. Nelson, T. Mast, "Control and alignment of segmented mirror telescopes: matrices, modes, and error propagation," Applied Optics, vol. 43, No. 6, Feb. 2004.

M.A. van Dam, R. G. Lane, "Extended analysis of curvature sensing," J. Opt. Soc. Am. A 19, 13901397, 2002.

J. Kennedy and R. Eberhart, "Particle swarm optimization," IEEE Inter. Conference on Neural Networks, 1995.

P. Saisan, S. Medasani, Y. Owechko, "Multi-view classifier swarms for pedestrian recognition and tracking," Proceedings of OCTBVS, CVPR, 2005.

* cited by examiner

METHOD AND APPARATUS FOR OPTIMAL PLACEMENT OF ACTUATORS FOR SHAPING DEFORMABLE MATERIALS INTO DESIRED TARGET SHAPES

PRIORITY CLAIM

The present application is a non-provisional patent application, claiming the benefit of priority of U.S. Provisional Patent Application No. 60/866,813, filed Nov. 21, 2006, titled, "Method And Apparatus For Optimal Placement Of Actuators For Shaping Deformable Materials Into Desired Target Shapes."

BACKGROUND OF THE INVENTION (1) Technical Field

The present invention generally relates to the field of controlling the shape of a deformable material, and more particularly to a method and apparatus for the optimal placement of actuators for controlling the shape of an elastically deformable material into a target shape using a number of actuators.

(2) Background

The problem of deformable material shape control and sensing has been studied most widely in the context of adaptive optics and segmented mirror telescopes using brute force approximations and sub-optimal over-engineering approaches for placement of and sensors and actuators. See, for example, G. Chanan, D. G. Mac Martin, J. Nelson, T. Mast, Control and Alignment of Segmented Mirror Telescopes: Matrices, Modes, and Error Propagation, Applied Optics, Vol. 43, No. 6, February 2004; and M. A. Van Dam, R. G. Lane, Extended Analysis of Curvature Sensing, J. Opt. Soc. Am. A 19, 13901397, 2002.

Conventional methods for shape sensing of deformable materials involve dense surface shape sensing. In order to achieve dense surface shape sensing, one has to resort to either dense range sensing or photogrammetric methods that reconstruct the three-dimensional (3-D) shape of a surface from stereoscopic views of the surface shape. These methods require high dimensional sensor information. Both range scanning and 3-D stereoscopic photogrammetry require costly equipment, dense sensing structures and computationally expensive sensor data processing stage.

A fundamental challenge in optimization of actuator placement for shaping deformable materials is the availability of efficient and simple models for computing the material shape as a function of geometric configuration of actuators. For example, classical convex optimization methods require computation of gradients corresponding to explicit mathematical description of the surface shape as related to geometry of the actuator network that in turn require a model to compute the gradients from and are often plagued by the local minima traps. These challenges so far have not been satisfactorily addressed in the scientific or industrial communities.

The ever increasing electromechanical complexity of actuation sensing and control mechanisms for automated systems in vehicles and flight systems makes any optimization technology a significant factor in energy cost saving ventures. For example, the reduction in number of actuators in flight systems and automobiles can lead to a significant decrease in production costs as well as energy savings measures. The reduction costs vary depending on the weight and power requirements of the actuation and control mechanisms which are often considerable.

For the foregoing reasons, there is a need for high precision shaping such that the discrepancy or mathematical error between the actual shape of an elastic material and that of the target shape is minimized. There is another need for an apparatus which determines the optimal placement of actuators responsible for the shaping of an elastically deformable material into target shapes using sparse number of actuators.

SUMMARY OF THE INVENTION

Accordingly, it is an object of the present invention to provide a method, an apparatus, and computer program product for the optimal placement of actuators responsible for the shaping of elastically deformable materials into target shapes. It is also an object of the present invention to use a sparse number of actuators while simultaneously reducing the discrepancy between actual deformed shapes and target shapes is minimized.

One aspect the present invention provides a method for the optimal placement of a network of actuators for actively shaping an elastically deformable material into a desired shape, the method comprising acts of: obtaining a placement of the network of actuators by evolving a set of actuator parameters associated with the network of actuators using a particle swam optimization algorithm; and determining, based upon a discrepancy between a deformed shape of the elastically deformable material associated with a selected placement of the plurality of actuators and the desired target shape, whether obtained placement of the network of actuators is an optimal placement.

In another aspect, the act of obtaining a placement of the network of actuators by evolving a set of actuator parameters more specifically comprises acts of: determining a desired target shape for the elastically deformable material; initializing a set of actuator parameters corresponding to the position and displacement of each of the network of actuators with respect to the elastically deformable material; positioning and actuating the network of actuators according to the set of actuator parameters, the actuators causing a deformation of the elastically deformable material; determining an actual shape of the deformed elastically deformable material; comparing a discrepancy between the target shape and the actual shape of the deformed elastically deformable material to a predetermined threshold, the predetermined threshold representing a maximum allowable discrepancy between the target shape and the actual shape of the elastically deformable material, within which threshold the actuators are considered to be optimally placed; and when the discrepancy between the target shape and the actual shape of the elastically deformable material is outside of the predetermined threshold, generating a new set of actuator parameters by using a particle swarm optimization algorithm, and repeating the method from the act of positioning and actuating the network of actuators until the predetermined threshold is reached, whereby through this iterative process an optimal placement of actuators can be determined.

In another aspect, the present invention is a data processing system for the optimal placement of a network of actuators for actively shaping an elastically deformable material into a desired shape, the data processing system comprising one or more processors configured to perform the operations of the method of the present invention, as previously described.

In yet another aspect, the present invention is a computer program product for the optimal placement of a network of actuators for actively shaping an elastically deformable material into a desired shape, the computer program product comprising computer-readable instructions encoded on a computer-readable medium executable by a computer having a processor for causing the computer to perform the operations of the method of the present invention, as previously described.

BRIEF DESCRIPTION OF THE DRAWINGS

The objects, features and advantages of the present invention will be apparent from the following detailed descriptions of the disclosed aspects of the invention in conjunction with reference to the following drawings, where.

DETAILED DESCRIPTION

Figure 1:
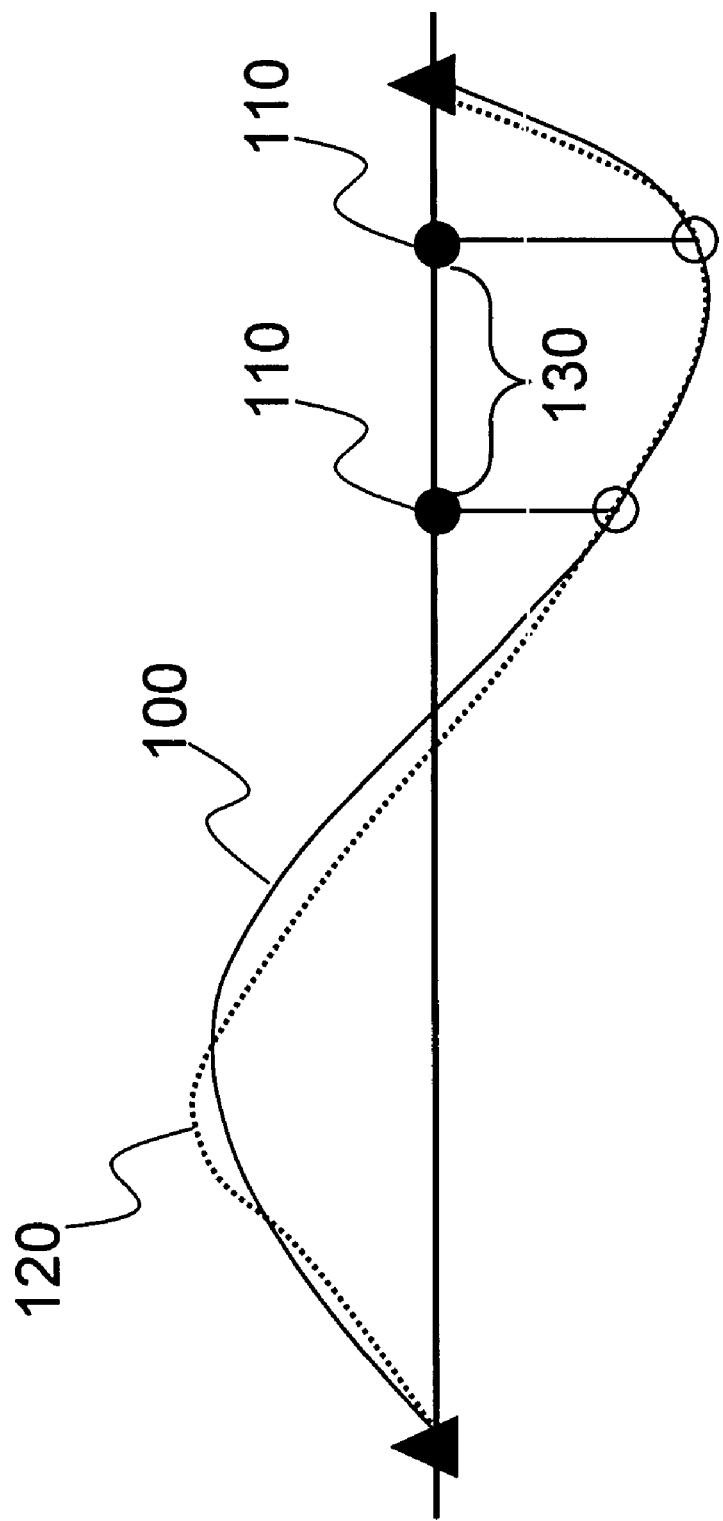
FIG. 1 is a two-dimensional illustration of an exemplary deformable material shaped by two actuators.

The present invention relates to a method, an apparatus, and computer program product for determining and positioning a finite (sparse) set of actuators within an actuator network to achieve a target shape with minimal mathematical error (limit). The sparse set of actuators within the actuator network are positioned in order to achieve a target shape with a minimal amount of mathematical error between the actual shape and that of the target shape. If the mathematical error between the target shape and the actual shape is not within a predetermined threshold, the sparse set of actuators within the actuator network must be repositioned. An optimum position, one in which the target shape is achieved with a minimal amount of mathematical error and the least amount of activations, may then determined.

To determine the optimum position of the actuators within the actuator network, a system of mathematical models is used to relate the geometry of the actuator network to the surface shape of the elastic material being deformed. These mathematical models, often referred to as elasticity equations, are a system of differential equations which describe the physical behavior of the deformable material. A variety of numerical methods are then used to solve for the deformable material's shape as a function of the geometry of the actuator network and the elastic material's displacements induced by the actuator network. Once the actual shape has been determined it is compared with the target shape and the optimum placement of the actuators is determined using shape matching.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 108, Paragraph 6. In particular, the use of "step of" or "act of" in the claims herein is not intended to invoke the provisions of 35 U.S.C. 108, Paragraph 6.

Below, an introduction to the present invention is provided to give an understanding of the specific aspects. Then, an overview of the principal aspects of the present invention is presented. Finally, a conclusion is provided to briefly summarize the method according to the present invention.

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of layers and other elements shown in the accompanying drawings may be exaggerated to more clearly show details. The present invention should not be construed as being limited to the dimensional relations shown in the drawings, nor should the individual elements shown in the drawings be construed to be limited to the dimensions shown.

1.0 Introduction

Referring to FIG. 1, a side perspective of an actual material shape 100 induced by a plurality of actuators 110 is superimposed onto the desired or target shape 120. A computational algorithm for the optimal positioning and repositioning of actuators 110 to reduce the error between the actual shape 100 the target shape 120 has been is disclosed. The computational algorithm allows for reduced error and the controlled deformation of a continuously deformable material shape 100 (conceptually, an infinite dimensional construct) using a sparse number of actuators 110.

The position of the actuators 110 is monitored as the actuators 110 either pull or push on the material surface 100. In order to determine the optimal position of the actuators 110, the contours of the deformable material's surface shape 100 is closely monitored using an optimization equation. Throughout the deformation process the position of the actuators 110 within the actuator network 130 are adjusted to reduce the mathematical error between the desired target shape 120 and the actual shape 100. The actual shape 100 is estimated from measurements obtained by one or more a-system sensors. The mathematical error between the actual shape 100 and the target shape 120 is minimized in the global sense by positioning the actuators 110 in locations where they will be able to affect the greatest change. An optimization equation is developed to characterize the discrepancy between the target shape 120 and the actual shape 100. At a high level of abstraction, the optimization problem can be stated by equation (1).

$$e(t) = \|R_{Target} - R_{Actual}(\text{control})\| \tag{1}$$

$R_{Target}$ represents the target shape 120 while $R_{Actual}$ represents the actual shape 100 of the elastically deformable material that either has or is undergoing controlled deformation by the actuator network 130. The shape matching and optimization is accomplished using a stochastic optimization paradigm, such as particle swarm optimization (PSO).

1.1 Shape Sensing Theory and the Optimization of Actuator Position

Solutions to elasticity equations along with boundary conditions define the surface shape of the associated deformable structure. One non-limiting example of such a deformable structure is a flexible beam. In the case of a flexible beam, the set of partial differential equations can be simplified to the following equations:

$$EI(x)\frac{d^4 y}{dx^4} = -W(x) \qquad (2)$$

$$EI(x)\frac{d^3 y}{dx^3} = S(x) \qquad (3)$$

$$EI(x)\frac{d^2 y}{dx^2} = M(x) \qquad (4)$$

While it is feasible to solve equations (2) (3), and (4) for simple geometric objects with simple boundary conditions, generally there is no closed form solution for arbitrarily complex geometries and boundary conditions. One must often resort to restrictive assumptions and non-trivial and extraneous mathematical modeling techniques from functional analysis and shape theory. See, for example, N .1. Akhiezer and 1. M. Glazman, Theory of Linear Operators in Hilbert Spaces, Frederick Ungar Publisher, 1966; G. H. Golub and C. F. Van Loan, Matrix Computations, The John Hopkins University Press, p. 601, 1996; and P. Saisan, A Bissacco, A. Chiuso, and S. Soatto, Modeling and Synthesis of Facial Motion Driven by Speech, Proceedings of ECCV, Prauge, 2004; which are incorporated herein by reference in their entirety.

Alternatively, the set of partial differential equations may be more practically solved by numerical methods akin to finite element methods. While it is possible to compute the shape of the deformable material, hereinafter represented as $r(x)$, numerically with some finite precision for a given set of actuator parameters, hereinafter represented as $\lambda$, an explicit model of the shape as function of actuator parameters in the form of Equation (5), may not be feasible:

$$r(x)=F(x;\lambda) \qquad (5)$$

It is assumed that the shape is described as a continuously deformable (infinite dimensional) variable $r(x)$ with $x \in \Omega$, where $\Omega$ defines the geometry of the deformable material. Given the shape description of equation (5), the optimization problem of Equation (1) can be rewritten as:

$$\lambda^* = \stackrel{inf}{\lambda} \|R_{Target} - F(x; \lambda)\| \qquad (6)$$

with $\lambda \in R^n$ describing the actuator network's geometry and full displacement configuration. Here $F:R^n \to M$ describes the solution of elasticity equations over the domain $\Omega$, as parameterized by $\lambda \in R^n$.

1.2 Actuator Position Optimization Theory

Particle swarm optimization is used to iteratively move towards the minima:

$$\lambda_{t+1}=g(\lambda_t;p) \qquad (7)$$

The mathematical mechanics of PSO defines the form of the parameter iteration dynamics described by the function g. Here p represents the internal optimization parameters.

Particle swarm optimization is a biologically-inspired evolutionary optimization paradigm that searches for the minima (or maxima) of objective functions having possibly large number of parameters. Particle swarm optimization is an optimization method that has its roots in artificial life, specifically bird flocking and swarming theory.

A key aspect of PSO is the ability to minimize or maximize the cost function $f(x)$, with $F:\epsilon R^n \to R$, using a "swarm" of dynamic particles "flying" through the parameter space, $x \in \Omega - \epsilon R^n$, searching for the minima or maxima. Each particle evaluates the function along the particle's trajectory $x(t)$ with the ideal solution stored as $p_{best}$. The stored value $p_{best}$ represents a location where $f(x)$ is minimized along $x(t)$. As a particle travels along $x(t)$ each location is compared with the stored value of $p_{best}$. The current best or optimal solution among all the points is also tracked using a global best parameter $g_{best}$. At any given time t, the velocity of particle i, $v(t)$, is then updated to point towards $p_{best}$ and $g_{best}$, up to a random factor defined by system parameters. A wide variety of applications exist. The particle's dynamics are described as follows:

$$v^i(t+1)=\omega v^i(t)+c_1 q(p_{best}-x^i(t))+c_2 q(g_{best}-x^i(t)) \qquad (8)$$

$$x^i(t+1)=x^i(t)+v^i(t+1) \qquad (9)$$

This is essentially a discrete time dynamical system. Here $x^i(t)$ and $v^i(t)$ are the position and velocity vectors respectively. At time t of the i-th particle, $q \sim [0,1]$ is a uniformly distributed random variable, and $c_1$ and $c_2$ are parameters that weigh the influence of their respective terms in the velocity update equation. Further, $\omega$ is a decay constant which controls the swarm's asymptotic (convergence) behavior. The parameter q facilitates an initially random search of the solution space.

Particle swarm optimization operates on the assumption that in most practical problems good solutions usually have better than average solutions residing in a volume around the good solutions. The search for $p_{best}$ becomes more directed after a few iterations, depending on $f(x)$ and system parameters, as the swarm is attracted towards "favorable" regions. These "halo" solutions tend to attract the swarm and concentrate it on regions that are likely to contain good solutions. As such a search using PSO is very efficient.

PSO is similar to other evolutionary methods in that it does not use gradient information and can be used with ill-behaved cost functions. Furthermore, it has been found through empirical simulations that the number of particles and iterations required scale weakly with the dimensionality of the solution space. This is a highly desirable property for multivariate cost functions. PSO is not guaranteed to find the globally optimum solution, however like other stochastic optimization paradigms; the probability of finding a global solution is reasonably high.

Particle swarm optimization scales well with the growing number of parameters, which in one embodiment may be linearly proportional to the number of actuators. This allows for high precision shape matching for the optimal placement of a large actuator network. Furthermore, due to its global optimization properties, $g_{best}$, particle swarm optimization is more conducive to shape matching for complex target shapes. The end result is a highly efficient and effective algorithm for the placement of actuators with desirable global optimality properties.

The final step of the algorithm is the integration of PSO mechanics as described in Equation (8) and (9) into the objective function of Equation (6) which completes the characterization of the iteration dynamics function g from Equation (7). The limit of Equation (7), as defined by a user specified convergence threshold, will result in optimal actuator network geometry and displacement configuration that can actuate the reconfigurable deformable material into target shape with minimal mathematical error defined by the particular choice of the norm in Equation (6).

1.3 Shape Sensing and Actuator Position Optimization

Figure 2:
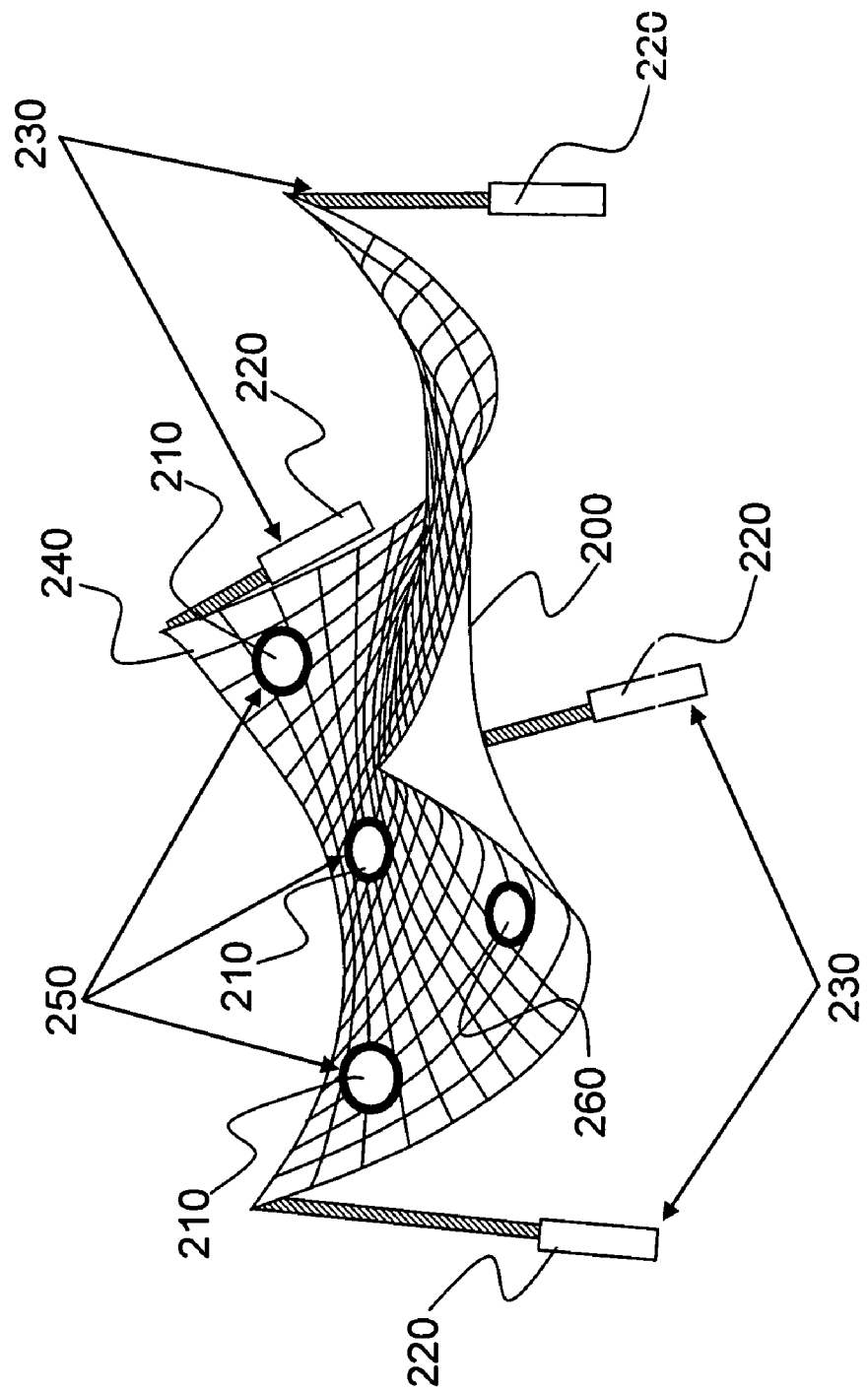
FIG. 2 is a three-dimensional illustration of an exemplary deformable material shaped by a network of actuators.

Referring to FIG. 2, an elastically deformable membrane's 200 shape is monitored by a network of sensors 210 while undergoing deformation by a plurality of actuators 220. Non-limiting examples of suitable actuators 220 include but are not limited to electrical motors, pneumatic actuators, hydraulic pistons, relays, comb drive, piezoelectric actuators, and thermal bimorphs. Even the type of actuators 220 within the actuator network 230 may be varied to suit particular applications. Although the actuators 220 are shown as uniformly shaped hydraulic pistons, the specific shape, size, and position of each actuator 220 may be varied to achieve a desired target shape. For example the width of the portion of the actuator 220 in contact with the membrane 200 may be increased in order to uniformly deform the membrane 200 over large distances. Further while the individual actuators 220 within the actuator network 230 are depicted as differentially pushing on the membrane 200 to achieve various local deformations, the individual actuators 220 may be configured to push, pull, or any combination thereof on the membrane 200 to achieve the desired effect.

Sensors 210 fastened to the membrane 200 are able to generate continuously variable physical signals in response to the local level of deformation caused by the actuator network 230. The sensors 210 mounted on the surface 240 of the membrane 200 gather information related to the local geometry or shape of the surface 240. Two or more sensors 210 may be used to form a sparse sensor network 250. The information gathered by the sparse sensor network 250 when combined with mathematical models is useful in shape estimation of the membrane 200.

A variety of sensors 210 may be used to collect information regarding the surface shape of the membrane 200. Non-limiting examples of suitable sensors include but are not limited to strain gauges and optical sensors. Strain gauges 260 for example generate variable signals in response to the compression and expansion of the material 200 they are fastened too. In one embodiment the overall surface geometry of the material 200 can be measured by using the sparse sensors network 250 as a low complexity model of the physical signals. The low complexity model can be solved using complexity reduction and learning methods. Non-limiting examples of suitable complexity reduction and learning methods include basis pursuit and other functional modeling methods.

(2) Specific Details

Figure 3:
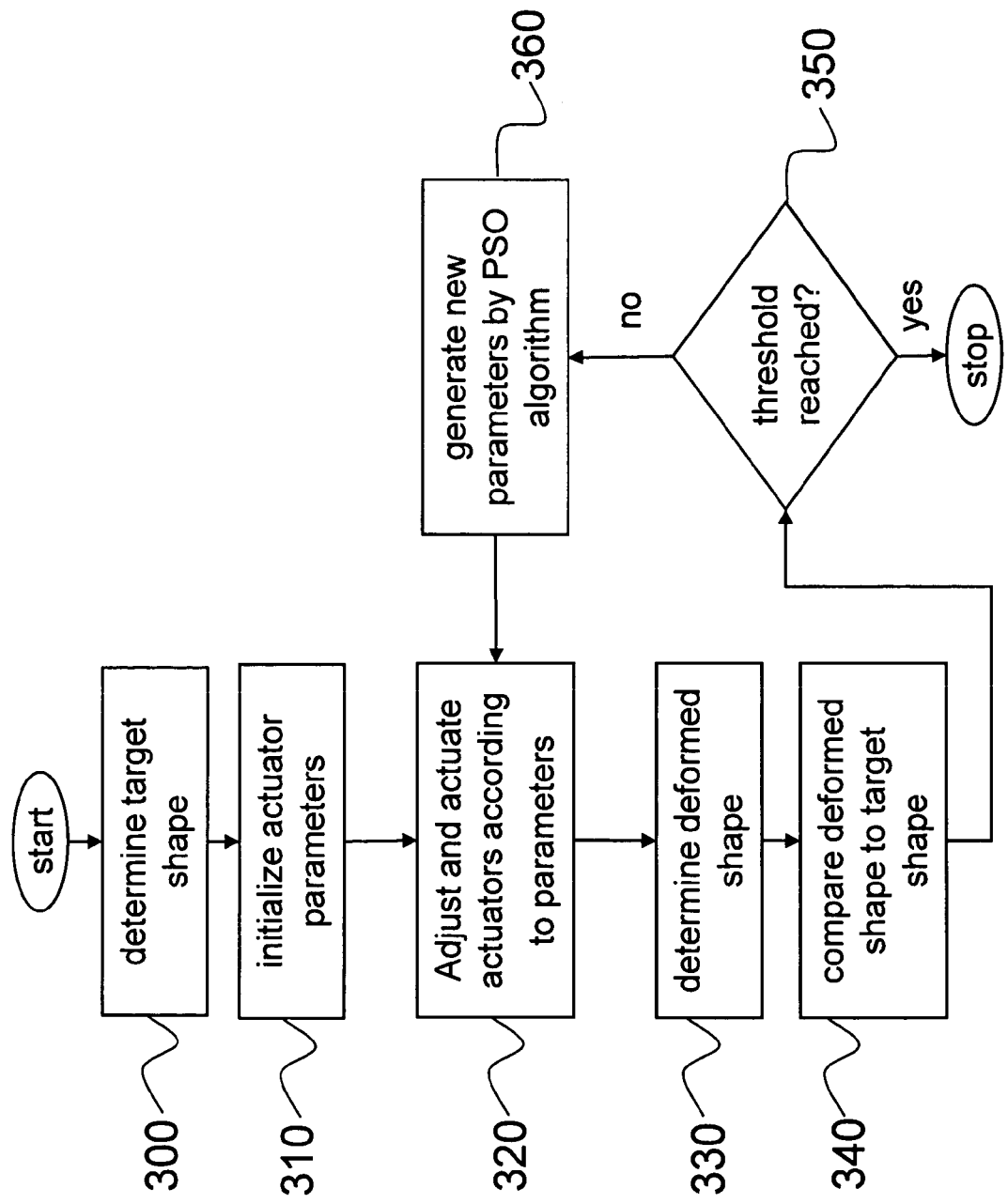
FIG. 3 is a flow diagram illustrating an exemplary method according to one embodiment of the present invention.

The invention may be embodied on a computer readable medium having contents for causing a computer-based information handling system to perform the steps depicted in FIG. 3. Once the system has been initialized, the target shape is determined 300. The determination of the target shape 300 may either be accomplished by instruction code contained on the computer readable medium or accomplished by an external source. The external source may either estimate the actual shape and feed the shape to the information handling system or send a minimal amount of information related to the actual shape for the information handling system to estimate the actual shape.

Parameters of the plurality of actuators are initialized with selected values within allowable ranges 310. The plurality of actuators is actuated to deform the deformable material 320 according to the parameters of the plurality of actuators from step 310. In step 330, the deformed shape of the deformable material is determined. In step 340, the discrepancy between the deformed shape and the target shape of the deformable material is determined. In step 350, the discrepancy determined from step 340 is compared to a predetermined threshold value. If the discrepancy is equal or less than the threshold, the discrepancy between the deformed shape and the target shape is minimized and a corresponding optimal placement of the plurality of actuators is reached. If the discrepancy is larger than the threshold, the method continues to step 360. In step 360, a new set of parameters for the plurality of actuators are generated by using PSO. The method continues by going back to step 320 wherein the new set of parameters for the plurality of actuators generated in step 360 are used to update the positions and displacement of the plurality of actuators in step 320. The method continues to follow the above sequence of steps until the discrepancy between the deformed shape and the target shape is determined to be equal to or less than the threshold as shown in step 350.

Figure 4:
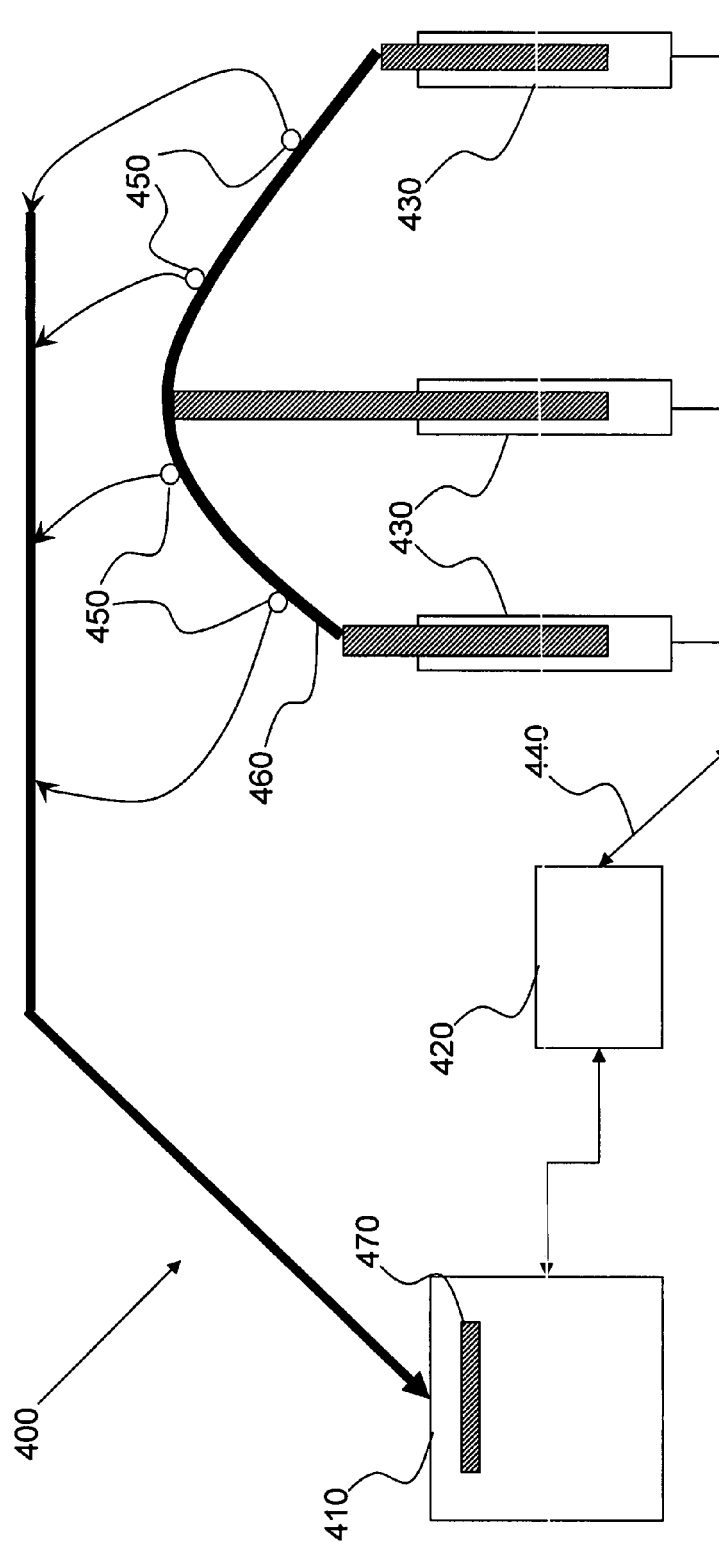
FIG. 4 is a schematic diagram illustrating an exemplary apparatus for precision shape sensing of a deformable material.

Referring to FIG. 4, an embodiment of the apparatus 400 the present invention is illustrated. The apparatus 400 comprises a processor 410 which is in communication with an actuator control box 420. The processor 410 may be any device capable of executing sequenced mathematical and/or logical instructions. Non-limiting examples of such devices are general purpose digital computers, Field Programmable Gate Array (FPGAs), or microcontroller chips.

A plurality of actuators 430 are coupled to the actuator control box 420 via an actuator communication bus 440. The processor 410 controls the plurality of actuators 430 via the control box 420. Furthermore, a plurality of curvature sensors 450 are placed on the surface of a deformable material 460 and coupled to the processor 410. The processor 410 receives a collection of data from the curvature sensors 450 representing the local curvatures of the surface of the deformable material 460 beneath the plurality of curvature sensors 450, wherein the processor 410 executes code, contained on a computer readable medium 470, implementing PSO algorithm to generate the plurality of actuator parameters associated with optimal placement of the plurality of actuators. The actuator control box 420 converts the plurality of actuator 430 parameters to corresponding output signals to control the plurality of actuators 430 wherein the plurality of actuators 430 deforms a deformable material 40 to a target shape 420.

(4) Principal Aspects

In a further embodiment, the present invention has three "principal" aspects. As described above, the first is a system for sensing and/or deforming a deformable material. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

The methods disclosed may be embodied in a computer program product either by coding in a high level language, or by preparing a plug-in application which is complied. Non-limiting examples of high-level languages include C, Fortran, PASCAL, and Python. The precision shape sensor described herein is useable as a plug-in supplemental program, as an independent module that may be integrated into any commercially available shape sensing program, or into any information processing device that is capable of modifying and displaying information or representations related to the geometric shape of a deformable material.

Figure 5:
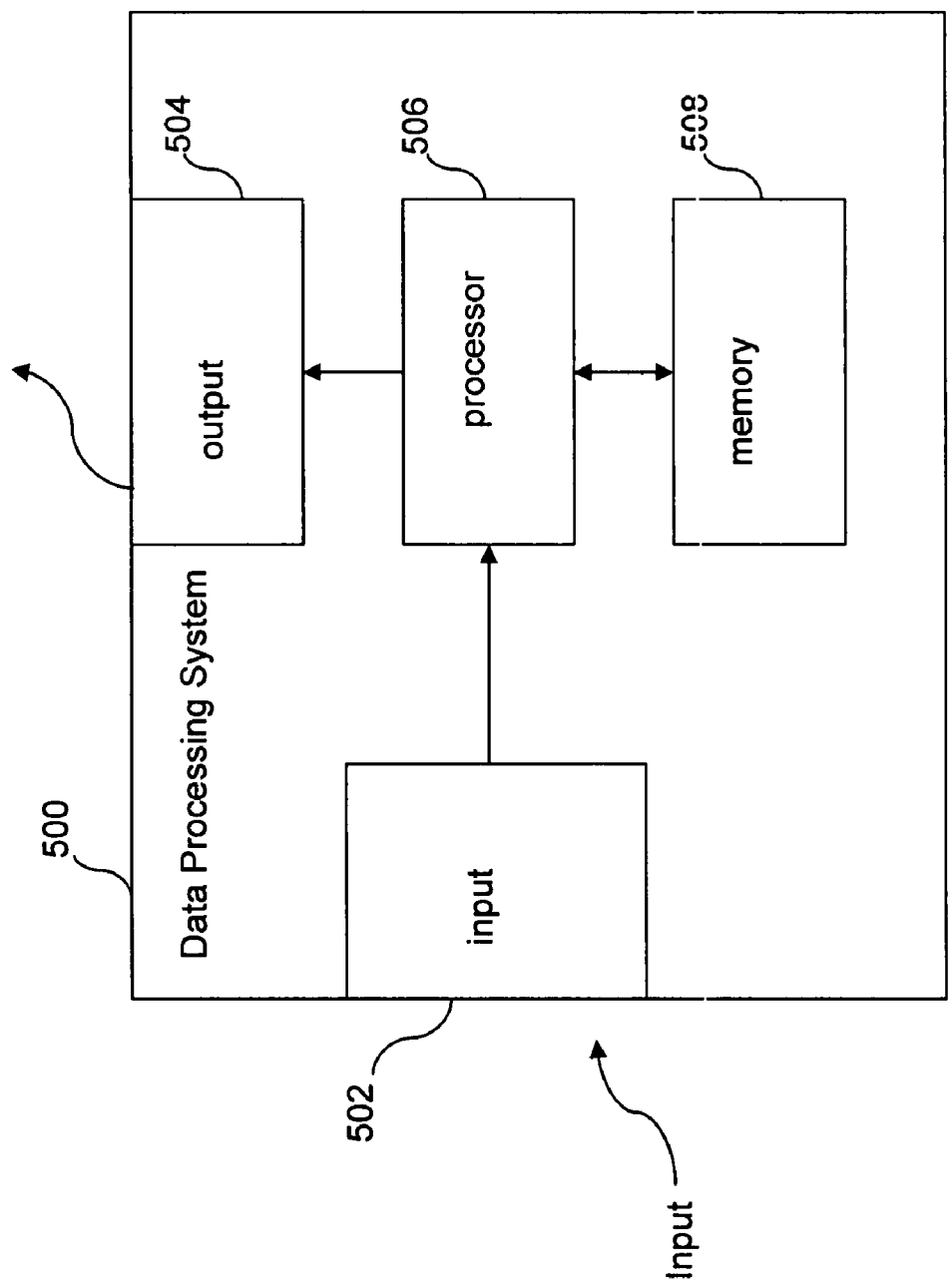
FIG. 5 is a block diagram of a precision shape sensing system according to the present invention.

A block diagram depicting the components of a system of the present invention is provided in FIG. 5. The system 500 comprises an input 502 for receiving information from at least one sensor. Note that the input 502 may include multiple "ports." Typically, input is received from at least one sensor, non-limiting examples of which include strain sensors. An output 504 is connected with the processor for providing information regarding the geometric shape of the deformable material to other systems in order that a network of computer systems may serve as an actuator placement system. Output may also be provided to other devices or other programs; e.g., to other software modules, for use therein. The input 502 and the output 504 are both coupled with a processor 506, which may be a general-purpose computer processor or a specialized processor designed specifically for use with the present invention. The processor 506 is coupled with a memory block 508 to permit storage of data and software that are to be manipulated by commands to the processor 506. The memory block 508 or data block refers to any possible computer-related information storage structure known to those skilled in the art, including but not limited to RAM, processor cache, hard drive, or combinations of those, including dynamic memory structures.

Figure 6:
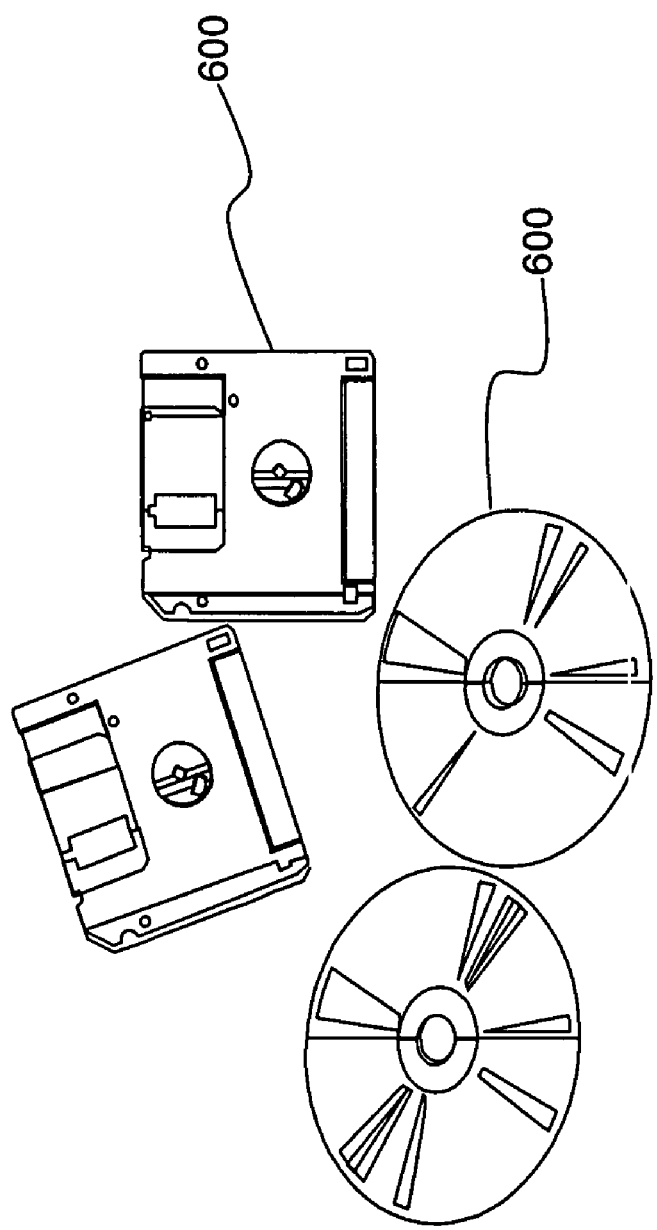
FIG. 6 is illustrative diagram of a computer program product embodying the present invention.

An illustrative diagram of a computer program product embodying the present invention is depicted in FIG. 6. The computer program product 600 is depicted as an optical disk such as a CD or DVD. However, as mentioned previously, the computer program product generally represents computer-readable instructions stored on any compatible computer-readable medium. Any currently existing or future developed computer readable medium suitable for storing data can be used to store the programs embodying the afore-described interface, methods and algorithms, including, but not limited to hard drives, floppy disks, digital tape, flash cards, compact discs, and DVDs. The computer readable medium can comprise more than one device, such as two linked hard drives. This invention is not limited to the particular hardware used herein, and any hardware presently existing or developed in the future that permits image processing can be used.

The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

As used in this disclosure, except where the context requires otherwise, the term "comprise" and variations of the term, such as "comprising", "comprises" and "comprised" are not intended to exclude other additives, components, integers or steps.

Also, it is noted that the embodiments are disclosed as a process that is depicted as a flowchart, a flow diagram, a structure diagram, or a block diagram. Although a flowchart may disclose various steps of the operations as a sequential process, many of the operations can be performed in parallel or concurrently. The steps shown are not intended to be limiting nor are they intended to indicate that each step depicted is essential to the method, but instead are exemplary steps only.

The term "storage medium" can represent one or more devices for storing data, including read-only memory (ROM), random access memory (RAM), magnetic disk storage mediums, optical storage mediums, flash memory devices, electrical storage mediums or other mediums for storing information in a form readable by a machine such as, for example, a computer.

In the foregoing specification, the invention has been described with reference to specific embodiments thereof. It will, however, be evident that various modifications and changes may be made thereto without departing from the broader spirit and scope of the invention. The specification and drawing are, accordingly, to be regarded in an illustrative rather than a restrictive sense. It should be appreciated that the present invention should not be construed as limited by such embodiments.

From the foregoing description, it will be apparent that the present invention has a number of advantages, some of which have been described herein, and others of which are inherent in the embodiments of the invention described or claimed herein. Also, it will be understood that modifications can be made to the device, apparatus and method described herein without departing from the teachings of subject matter described herein. As such, the invention is not to be limited to the described embodiments except as required by the appended claims.

What is claimed is:

1. A method for determining an optimal placement of a network of actuators for actively shaping an elastically deformable material into a desired target shape, the method comprising acts of:
    obtaining a placement location of the network of actuators by evolving a set of actuator parameters associated with the network of actuators using a particle swam optimization algorithm;
    sensing, with a sparse sensor network having a plurality of sensors fastened to the elastically deformable material, a local actual shape of the elastically deformable material, wherein at least some of the plurality of sensors are separate and distinct from the network of actuators such that they do not share a common placement location; and
    determining, based upon a discrepancy between the local actual shape of the elastically deformable material associated with a selected placement of the plurality of actuators and the desired target shape, whether the obtained placement location of the network of actuators is an optimal placement location.

2. The method of claim 1, wherein the act of obtaining a placement location of the network of actuators by evolving a set of actuator parameters comprises acts of:
    initializing the set of actuator parameters corresponding to the position and displacement of each of the network of actuators with respect to the elastically deformable material;
    positioning and actuating the network of actuators according to the set of actuator parameters, the actuators causing a deformation of the elastically deformable material;
    determining, based on information gathered from the sparse sensor network, the local actual shape of the deformed elastically deformable material;
    comparing a discrepancy between the target shape and the local actual shape of the deformed elastically deformable material to a predetermined threshold, the predetermined threshold representing a maximum allowable discrepancy between the target shape and the local actual shape of the elastically deformable material, within which threshold the actuators are considered to be optimally placed; and when the discrepancy between the target shape and the local actual shape of the elastically deformable material is outside of the predetermined threshold, generating a new set of actuator parameters by using a particle swarm optimization algorithm, and repeating the method from the act of positioning and actuating the network of actuators until the predetermined threshold is reached, whereby through this iterative process an optimal placement location of actuators can be determined.

3. A data processing system for determining an optimal placement of a network of actuators for actively shaping an elastically deformable material into a desired shape, the data processing system comprising one or more processors configured to perform operations of:

obtaining a placement location of the network of actuators by evolving a set of actuator parameters associated with the network of actuators using a particle swam optimization algorithm;

sensing, with a sparse sensor network having a plurality of sensors fastened to the elastically deformable material, a local actual shape of the elastically deformable material, wherein at least some of the plurality of sensors are separate and distinct from the network of actuators such that they do not share a common placement location; and determining, based upon a discrepancy between a deformed shape of the elastically deformable material associated with a selected placement of the plurality of actuators and the desired target shape, whether the obtained placement location of the network of actuators is an optimal placement location.

4. The data processing system of claim 3, wherein the operation of obtaining a placement location of the network of actuators by evolving a set of actuator parameters comprises operations of:

initializing the set of actuator parameters corresponding to the position and displacement of each of the network of actuators with respect to the elastically deformable material;

positioning and actuating the network of actuators according to the set of actuator parameters, the actuators causing a deformation of the elastically deformable material;

determining, based on information gathered from the sparse sensor network, the local actual shape of the deformed elastically deformable material;

comparing a discrepancy between the target shape and the local actual shape of the deformed elastically deformable material to a predetermined threshold, the predetermined threshold representing a maximum allowable discrepancy between the target shape and the local actual shape of the elastically deformable material, within which threshold the actuators are considered to be optimally placed; and when the discrepancy between the target shape and the local actual shape of the elastically deformable material is outside of the predetermined threshold, generating a new set of actuator parameters by using a particle swarm optimization algorithm, and repeating the method from the act of positioning and actuating the network of actuators until the predetermined threshold is reached, whereby through this iterative process an optimal placement location of actuators can be determined.

5. A computer program product for determining an optimal placement of a network of actuators for actively shaping an elastically deformable material into a desired shape, the computer program product comprising computer-readable instructions stored on a non-transitory computer-readable medium executable by a computer having a processor for causing the computer to perform operations of:

obtaining a placement location of the network of actuators by evolving a set of actuator parameters associated with the network of actuators using a particle swam optimization algorithm;

sensing, with a sparse sensor network having a plurality of sensors fastened to the elastically deformable material, a local actual shape of the elastically deformable material, wherein at least some of the plurality of sensors are separate and distinct from the network of actuators such that they do not share a common placement location; and determining, based upon a discrepancy between a deformed shape of the elastically deformable material associated with a selected placement of the plurality of actuators and the desired target shape, whether the obtained placement location of the network of actuators is an optimal placement location.

6. The computer program product of claim 5, wherein the operation of obtaining a placement location of the network of actuators by evolving a set of actuator parameters comprises operations of:

initializing the set of actuator parameters corresponding to the position and displacement of each of the network of actuators with respect to the elastically deformable material;

positioning and actuating the network of actuators according to the set of actuator parameters, the actuators causing a deformation of the elastically deformable material;

determining, based on information gathered from the sparse sensor network, the local actual shape of the deformed elastically deformable material;

comparing a discrepancy between the target shape and the local actual shape of the deformed elastically deformable material to a predetermined threshold, the predetermined threshold representing a maximum allowable discrepancy between the target shape and the local actual shape of the elastically deformable material, within which threshold the actuators are considered to be optimally placed; and when the discrepancy between the target shape and the local actual shape of the elastically deformable material is outside of the predetermined threshold, generating a new set of actuator parameters by using a particle swarm optimization algorithm, and repeating the method from the act of positioning and actuating the network of actuators until the predetermined threshold is reached, whereby through this iterative process an optimal placement location of actuators can be determined.

* * * * *